June 11, 1940.   C. G. WENNERSTROM   2,204,521
POWER TRANSMISSION MECHANISM
Filed May 26, 1937   7 Sheets-Sheet 1

Inventor:
Carl G. Wennerstrom
By: A. Trevor Jones
Atty.

June 11, 1940.   C. G. WENNERSTROM   2,204,521
POWER TRANSMISSION MECHANISM
Filed May 26, 1937   7 Sheets-Sheet 2

Inventor:
Carl. G. Wennerstrom
By: A. Trevor Jones
Atty.

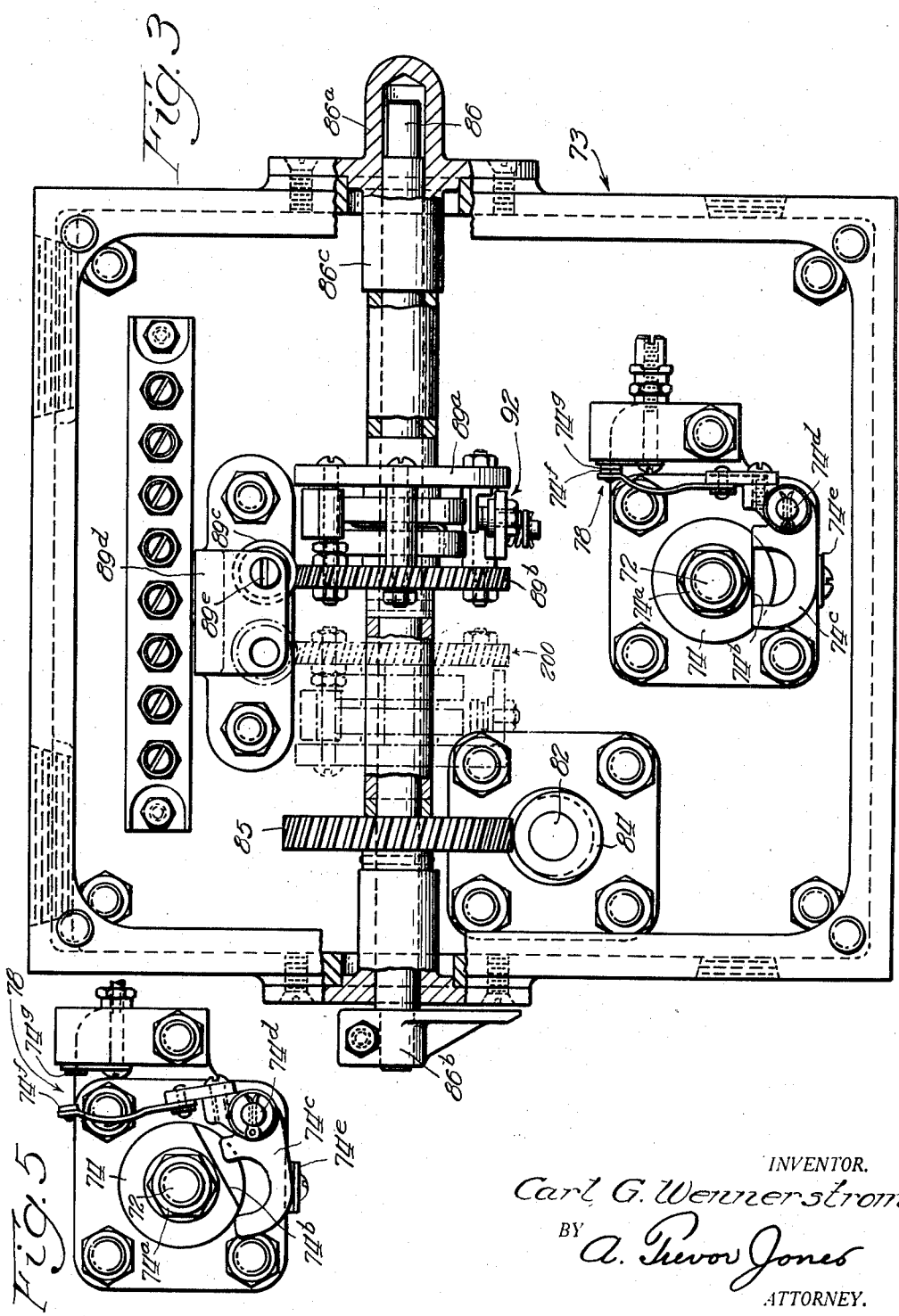

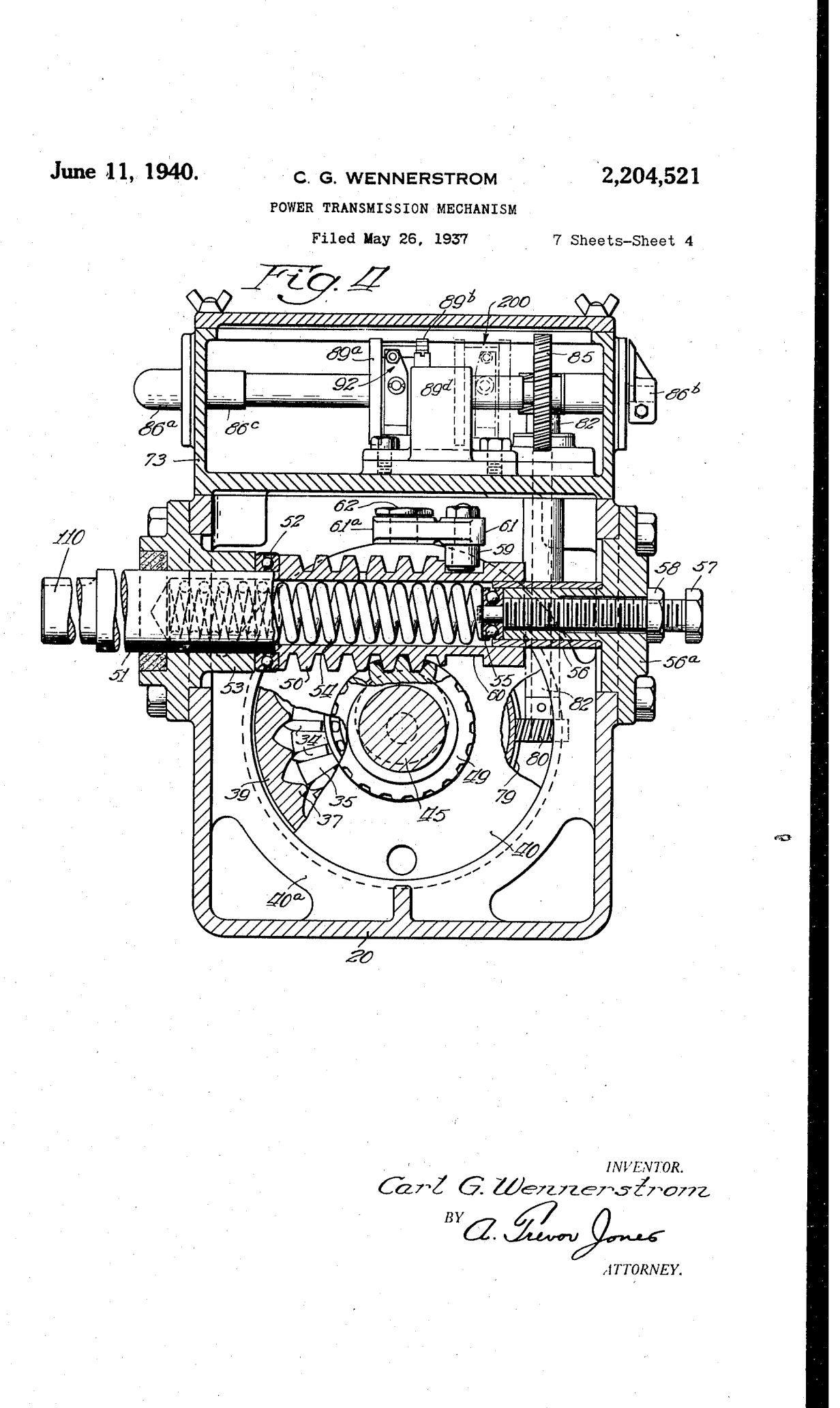

June 11, 1940.                C. G. WENNERSTROM                2,204,521
                         POWER TRANSMISSION MECHANISM
                         Filed May 26, 1937          7 Sheets-Sheet 5
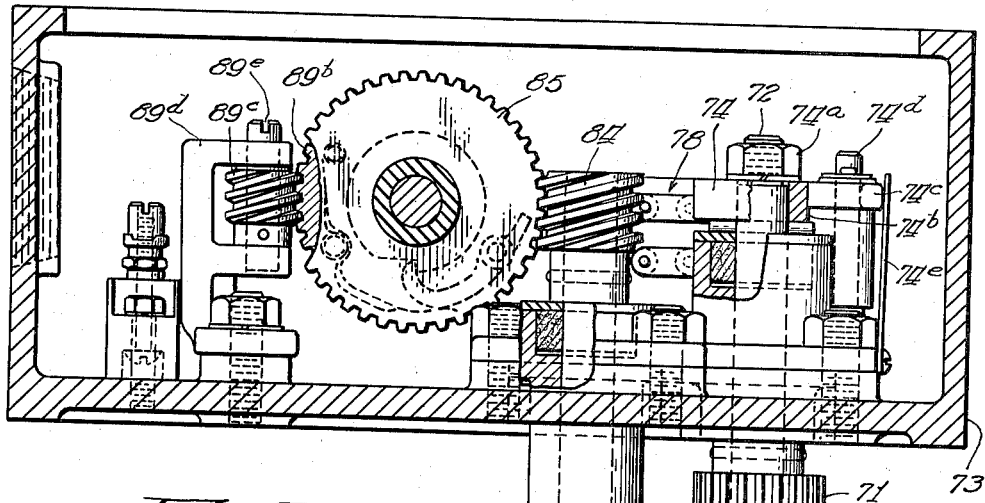
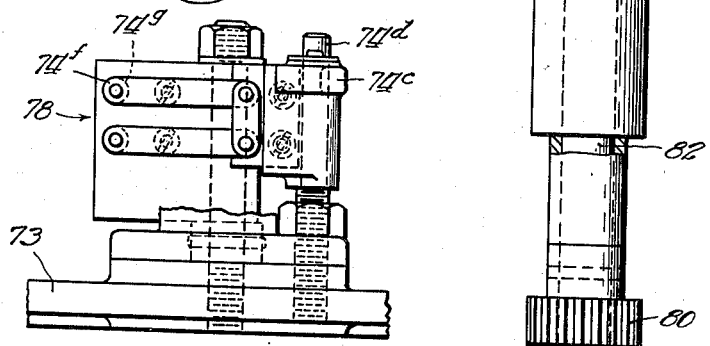
INVENTOR.
Carl G. Wennerstrom
BY A. Trevor Jones
ATTORNEY.

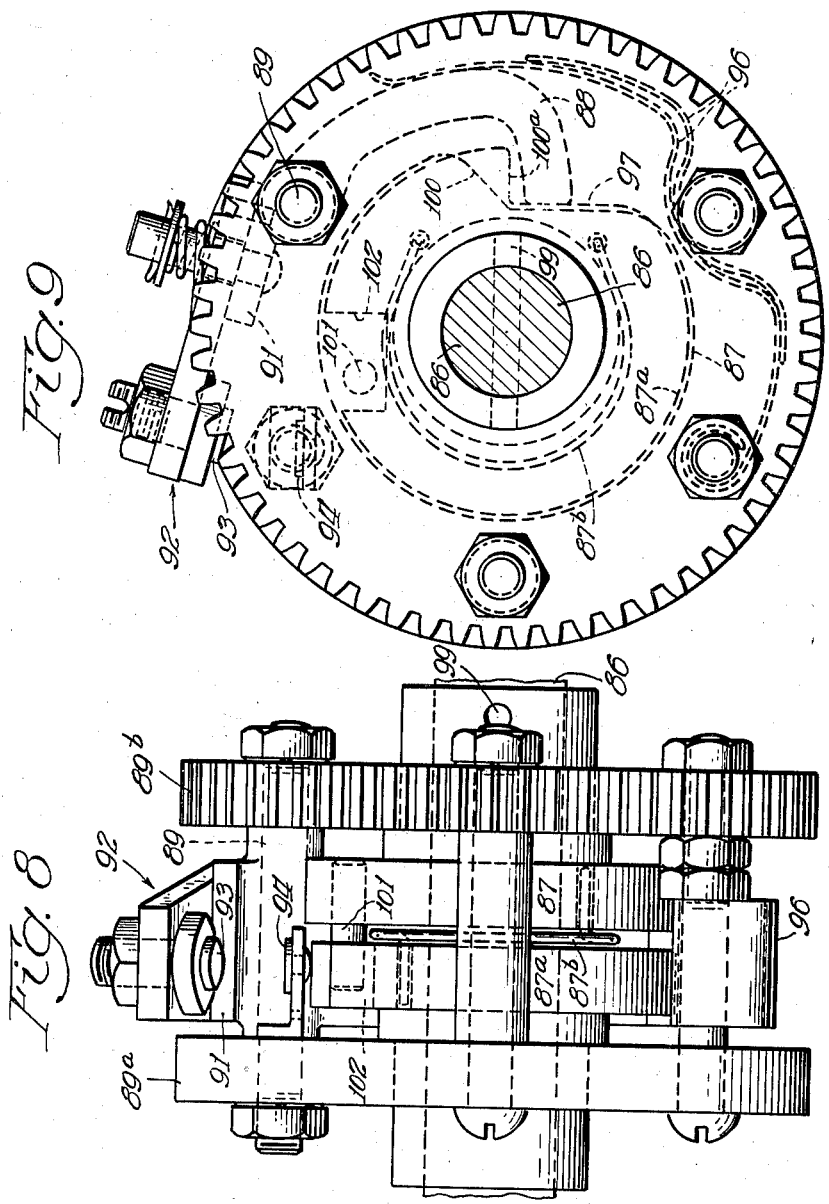

June 11, 1940.    C. G. WENNERSTROM    2,204,521
POWER TRANSMISSION MECHANISM
Filed May 26, 1937    7 Sheets-Sheet 7

INVENTOR.
Carl G. Wennerstrom
BY A. Trevor Jones
ATTORNEY.

Patented June 11, 1940

2,204,521

UNITED STATES PATENT OFFICE 2,204,521

POWER TRANSMISSION MECHANISM

Carl G. Wennerstrom, Evanston, Ill., assignor to
Universal Gear Corporation, Indianapolis, Ind.,
a corporation of Delaware Application May 26, 1937, Serial No. 144,819

11 Claims. (Cl. 192—150)

This invention relates to power transmission mechanism, more particularly for power driven valves and like devices in which tight seating of the valving is important while avoiding danger of damaging the meeting surfaces.

Among other objects, the invention aims to provide simplified and improved means for this purpose desirably housed as a unit.

Other objects and advantages will be apparent from the following description taken together with the accompanying drawings, in which:

Figure 1a is a cross-section on the line 1a—1a of Fig. 1;

Figure 3 is a plan view somewhat similar to Fig. 2 but showing an interior view of said top portion, on a somewhat larger scale;

Figure 4 is a cross-section taken on the line 4—4 of Fig. 1;

Figure 5 is another view of switch mechanism shown in Fig. 3, showing the switch in "off" position;

Figure 6 is another view of the upper part of parts shown in Fig. 1 looking from the opposite direction;

Figure 7 is an enlarged view of the overload switch mechanism;

Figure 8 is an enlarged view of the time interval switch mechanism;

Figure 9 is a side elevational view of the switch mechanism of Fig. 8;

Figure 1:
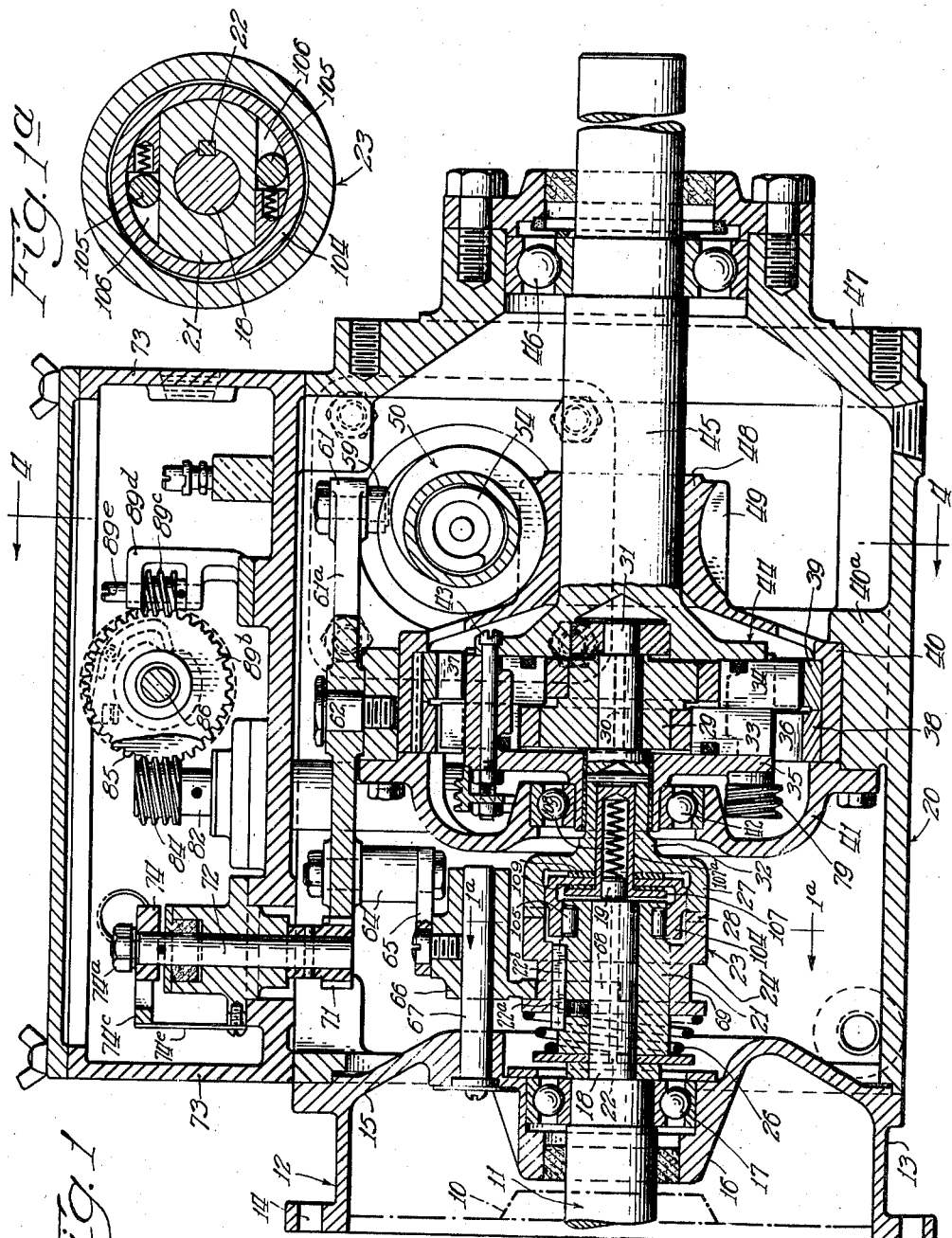
Figure 1 is a longitudinal sectional view of the improved device, parts being shown in elevation.

Referring to the illustrative construction shown in the drawings, the unitary mechanism may include an electric motor indicated diagrammatically at 10 and having a driving shaft 11. Secured to the motor 10 is the casing 12 comprising a plurality of sections, one of which is the section 13 directly secured to the motor as by bolts through holes 14. The casing 12 may be generally rectangular. The casing section 13 has a transverse wall 15, which forms a partition in the casing 12 as a whole and is centrally extended as at 16 to accommodate an antifriction bearing 17 for the shaft 11 which is extended as by reduced parts 18 into the casing section 20, also comprising part of the casing 12 adjacent the casing section 13. About the shaft extension 18 is the bushing 21 which is keyed, as by the feather connection 22, to rotate with the shaft 11. Set screw 22a prevents relative longitudinal movement of the shaft and bushing. About the bushing 21 is a two-part separable main clutch indicated generally by the numeral 23 and comprising a portion 24 which is splined as by the feather connection 22b to rotate with the shaft and also to move axially thereof against the force of a heavy coil spring 26 which tends to press the clutch section 24 into engagement with the other clutch section 27 of the main clutch 23 and to cause the interengageable jaws 28 of these clutch sections to mesh for the purpose of transmitting power from the motor to the clutch section 27. The clutch portion 27 is keyed to rotate the double eccentric 29 as by a feather connection 30 between this eccentric and the stub shaft extension 31 on the hub 32 of the clutch portion 27. The stub or input shaft 31 has a bearing in a hollow member 35 next described, to permit relative rotation of these parts.

The double eccentric 29 is part of a speed-changing mechanism following broadly the disclosures of the Pitter Patent No. 1,543,791 in which these eccentrics by their rotation with the motor shaft 11, through the clutch mechanism just described, cause the reciprocation of a series of radially disposed plungers 33 and 34. These plungers pass through slots in the hollow rotatable member 35 and into interengagement respectively with a series 36, 37 of beveled teeth cut internally in a pair of annular rings 38, 39. These rings are keyed to a normally stationary cylindrical spider 40 which has a bearing 40a in the wall of the casing section 20, in which, however, it is rotatable upon the occurrence of certain conditions hereinafter described.

The bearing for the spider 40 carries a casing partition 41 which is centrally apertured to accommodate an anti-friction bearing 42 for the rotatable member 35, this member being made a unit, by the bolts 43 with a hub 44 of the driven shaft 45 which has an anti-friction bearing 46 in the end wall 47 of the casing section 20 and constitutes the output shaft of the mechanism. The hollow member 35 also provides a journal for the hub 32 of the clutch portion 27, the hub 44 also providing a journal for the end of the stub shaft 31.

The plungers 33 and 34 thus constitute reactive parts which, under the influence of rotation of the input shaft 31, react with the teeth of the internal gear 40 to cause rotation of the output shaft 45.

It will be understood that when the motor is running and the clutch 23 engaged, reciprocation of the plungers 33, 34 which have beveled ends successively cammed by the eccentrics 29 against the normally stationary beveled teeth 36, 37 will cause the member 35 and with it the output shaft 45 to rotate (counterclockwise, Fig. 4) at greatly reduced speed with respect to rotation of the motor shaft 11. It will also be understood that this bevel thrust or camming action between the plungers and the internal teeth requires that the teeth and with them the spider 40 to which they are keyed be held substantially stationary to cause transmission of power to the shaft 45. In order normally to maintain the spider 40 thus against rotation, the hub 48 of the spider through which the shaft 45 passes is formed into a worm wheel 49 which meshes with a hollow worm 50 formed integrally with a transversely disposed worm shaft 51 carried by the casing section 20 as best shown in Fig. 4. The teeth of the worm 50 are so cut that rotation of the worm wheel 49 will tend to move the worm shaft 51 axially and so as not to cause substantial rotation of the worm. Thus unless the worm shaft 51 can move axially the worm wheel 49 and with it the spider 40 are locked against rotation.

The worm shaft 51 is normally maintained against axial movement in one direction by the anti-friction bearing 52 which it has with the bearing 53 which carries the worm-shaft in the casing section 20, and in the other direction compression coil spring 54 disposed within the hollow interior of the worm-shaft and bottomed at one end against the shaft to press it toward the thrust bearing 52 and at the other end bottomed against an anti-friction thrust bearing 55 carried by the bearing bushing 56 and gland 56a which supports the free end of the worm-shaft 51. By an adjustment screw 57 which passes through the bushing and gland, the bearing 55 may be moved inwardly of the shaft further to compress the spring 54 and thus increase the resistance to movement of the worm-shaft 51, lock-nut 58 serving to secure the selected adjustment.

When the output shaft 45 encounters an overload, as for example when a valve (not shown) driven by the shaft 45 reaches the limit of its closing movement, the increased resistance to turning of the shaft 45 will be transmitted to the worm wheel 49 and will enhance the tendency of this worm wheel to turn in clockwise direction, looking at Fig. 4. As soon as this increased tendency of the worm wheel 49 to rotate in this direction overcomes the force of the spring 54, the worm-shaft 51 will move to the right in Fig. 4, permitting the worm wheel 49 to make a slight partial rotation. This in itself relieves the motor torque on the output shaft 45. Before this rotation has proceeded more than a very slight degree, however, the motor will be disconnected as presently described, positively relieving the motor torque on the worm wheel 49 and causing the latter to be then brought to rest by limit of movement to the right of the worm-shaft 51. Driven shaft 45 also comes to rest due to the resistance encountered. The worm-shaft 51 at this time cannot move back again to the left under the influence of the spring 54, for the reason that to do so it would have to rotate the worm wheel 49 and with it the shaft 45, counterclockwise, against the resistance to rotation of the shaft which is already greater than the force of the spring 54, as previously described.

Disconnecting of the motor, as just referred to, will now be described. In its axial movement to the right in Fig. 4, the worm-shaft 51 moves the roller pin 59, which is disposed in an annular groove 60 in the shaft. This roller pin is carried by one end 61 (Fig. 2) of the lever 61a which is pivoted at 62 within the casing section 20. The other end 63 of this lever carries another pin 64 which forms a bell-crank connection as by the link 65 with the slidable block 66 carried by the stud 67 supported on the casing partition 15. The block 66 has a yoke 68 which projects into the annular groove 69 in the clutch portion 24 of the main clutch 23. Thus when the worm-shaft 51 moves axially to the right in Fig. 4, the lever end 63 moves in a direction to straighten the link 65 and thus to retract the clutch portion 24 and to place the clutch portions 24 and 27 out of engagement, disconnecting the motor from the stub shaft 31 and consequently from driving connection with the output shaft 45.

The lever end 63 also is formed into a gear segment 70 which engages with a pinion 71 fixed to the lower end of a switch shaft 72 carried adjacent the lever end 63 by the upper casing portion 73. Movement of the lever end causes rotation of the switch shaft 72 and with it a cam member 74, Figs. 3 and 5, secured to shaft 72 by nut 74a by means of which relative rotative positions of the shaft and cam may be adjusted. Thus, at the same time that the motor is disconnected from the output shaft, the cam 74 is rotated to disconnect the current to the motor. Cam 74 has a flat face 74b, which when in position as in Fig. 3, permits switch contact lever 74c pivoted at 74d to move under the influence of a spring 74e to close the overload switch 78 having the insulated contacts 74f and 74g which (by suitable wiring, not shown) may be normally in the motor circuit. As shown in Fig. 5, these contacts have been opened by action of the lever 61a and cam 74.

At this time insulated contacts 93, 94 of another or time interval switch mechanism 92 are closed and in circuit with the motor, so that by manually actuating an operator controlled switch (not shown) the motor may be energized for reverse or opening movement of the valve through contacts 93, 94.

Upon the actuation of such manually controlled switch, to open the valve, the motor begins to operate in a direction to open the valve. At the beginning of such operation, as already described, the clutch 23 is disengaged. By reference to Figs. 1 and 1a, however, it will be seen that within the hollow interior of the clutch portion 27 of the main clutch 23 is an auxiliary one-way clutch which transmits power from the motor shaft 11 to the output shaft 45 independently of the main clutch 23 but only when the motor is operating in a direction to open the valve and while the main clutch 23 is disengaged.

This auxiliary clutch, just referred to, comprises the cup 104 which surrounds the shaft end 18 of the motor shaft 11. A pair of rollers 105 are loosely disposed in tapered recesses 106 in the sleeve 21 and upon rotation of the motor shaft 11 in a direction to open the valve (or clockwise, Fig. 1a), the rollers 105 tend to wedge themselves into the smaller ends of the tapered recesses 106 and thus transmit power from the motor shaft 11 to cup 104. The cup 104 is centrally perforated to receive therethrough the gland 107, the hollow stem 107a of which is journaled loosely in the hub 32 of the clutch portion 27. A light compression coil spring 108 within this hollow stem presses against the loose plug 19 carried by the gland and pressing against the end of the shaft 18 and urges the gland 107 away from the shaft end. This tendency of the gland to move away from the shaft end is limited by the flanged portion of the gland which presses the cup 104 between a pair of friction discs 109 and against the clutch portion 27, thus providing a friction clutch which causes sufficient rotation of the stub shaft 31 to tend to rotate the shaft 45 clockwise (Fig. 4) which rotates the worm wheel 49 in a counter-clockwise direction (looking at Fig. 4) a sufficient degree to move the worm 50 axially back to the left to the position shown in Fig. 4, whereupon further rotation of the worm wheel 49 is prevented by the worm.

Figure 2:
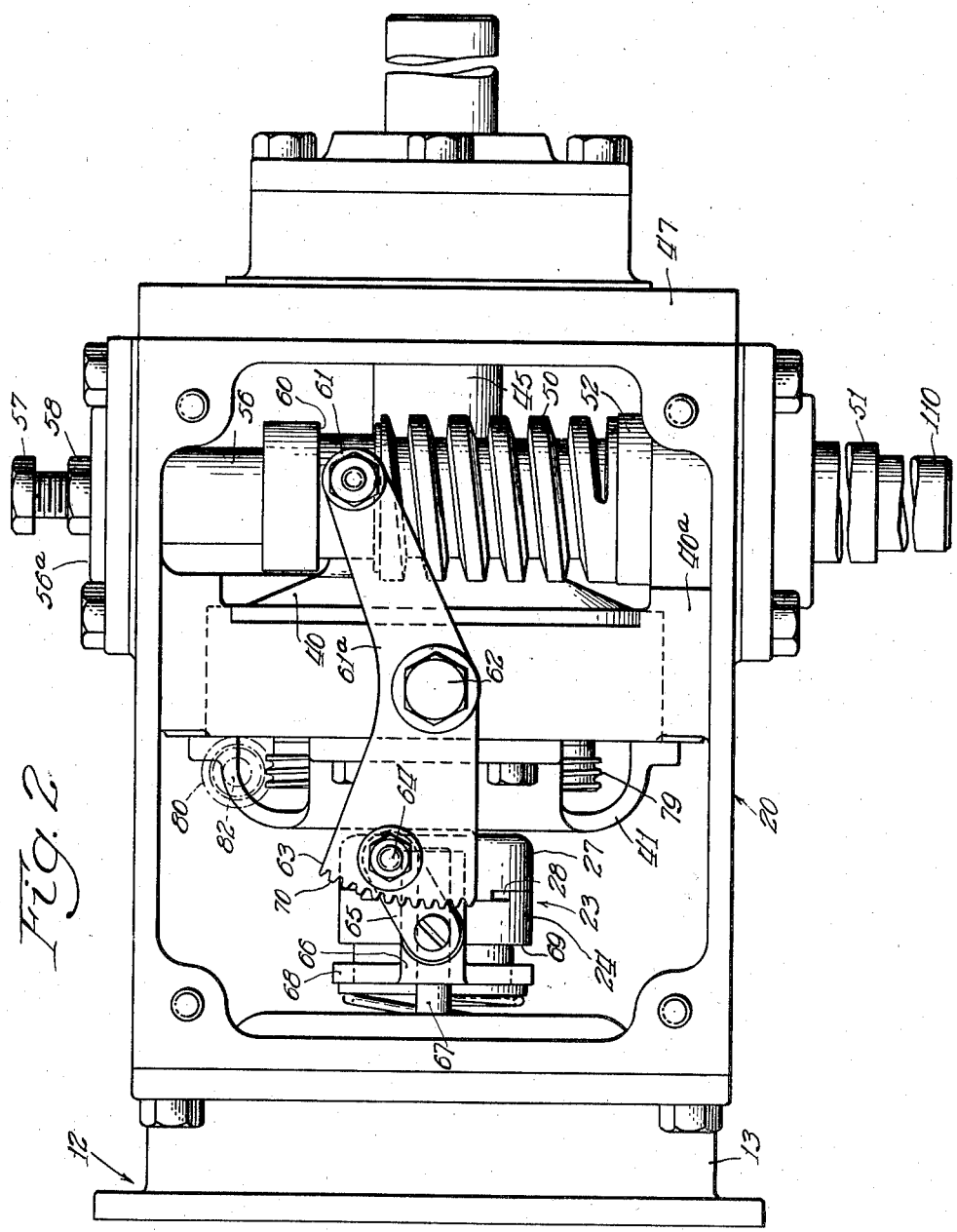
Figure 2 is a plan view with a top portion removed.
Figure 10:
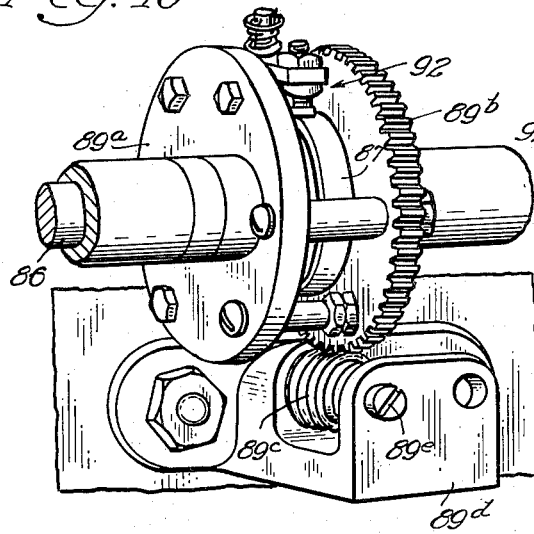
Figure 10 is a perspective view, on a somewhat reduced scale, of the switch mechanism of Figs. 8 and 9, looking from the opposite direction.
Figure 11:
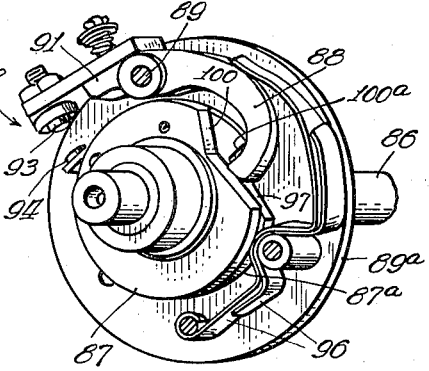
Figures 11, 12 and 13 show various operative positions of this latter switch mechanism.

Simultaneously with the axial movement of the worm 50 to the left (Fig. 4) as just described, the lever ends 61 and 63 move to the position shown in Fig. 2, permitting the block 63 to be retracted under the influence of the spring 26, whereupon the clutch portion 24 moves toward the clutch portion 27 to cause the jaws 28 to interengage and thus establish a positive power transmission means between the motor shaft 11 and the speed reduction unit through the main clutch 23 which then transmits the power to the output shaft 45 to open the valve. The auxiliary clutch is ineffective during the remainder of the valve-opening operation and during the succeeding valve-closing operation and until the main clutch 23 is again disengaged by the over-load encountered by the shaft 45 at the end of the next valve-closing operation.

Movement of the lever end 63 to the position shown in Fig. 2 also turns the shaft 72 in a direction to close the switch 78 so that by manual operation of the operator controlled switch a circuit may be later established through the switch to close the valve.

In order to shut off the motor at the end of the valve-opening rotation of the shaft, the switch mechanism 92 is provided which is adapted to be opened after a given time interval. For the purpose just referred to, the periphery of the hollow rotatable member 35 is formed into a large worm 79 which engages pinion 80 fixed to the switch shaft 82. The shaft 82 is carried by its upper end into the upper casing section 73. At the upper end of the shaft 82 is fixed a switch control mechanism comprising another worm 84 which engages a worm wheel 85 (Figs. 3 and 6) rigid with a counter-shaft 86. Counter-shaft 86 is carried in suitable bearings 86a, 86b and sleeve 86c carried by the casing section 73. To shaft 86 is keyed a pair of discs 87, 87a upon which rides a pawl 88 pivoted upon a support 89, and having an extension 91 beyond its pivoted point to which is secured the contact 93 of the switch 92 having the insulated contacts 93 and 94. Springs 96 urge the pawl 88 upon the periphery of the discs 87, 87a. The discs 87, 87a which form a unitary cam for the pawl have jointly a peripheral cut 97 into which the pawl 88 drops (aided by the springs 96) when the discs 87, 87a are rotated by the shaft 86 to cause the slot to register with the pawl. This dropping of the pawl 88 raises the insulated contact 93 away from the contact 94 to break the motor valve opening circuit.

In order to cause a quick break in the circuit and avoid arcing, the following mechanism is provided: The disc 87 is keyed by the pin 99 to turn with the counter-shaft 86, while the disc 87a is loose upon this counter-shaft and is driven by a pin 101 fixed to the disc 87 and received in a slot 102 in the disc 87a as best shown in Fig. 9. The disc 87 is of slightly larger diameter than the disc 87a and the pawl 88 normally (that is, when the circuit is closed through this switch) rides on the periphery of the disc 87. As the counter-shaft 86 rotates counterclockwise (Fig. 9), the pin 101 travels in the same direction in the slot 102 until it drives the disc 87a. A spring 87b anchored at each end to one of the discs 87, 87a respectively tends to hold the pin 101 against this end of the slot 102 so that the right-angular face 100a of the disk 87a, is projected forwardly of the incline cut 100 of the disc 87. Consequently as both discs now rotate together counterclockwise with the counter-shaft 86 when the cut 97 arrives in the vicinity of the pawl, the pawl is momentarily supported by disc 87a and drops quickly off this disc, the right-angular face 100a permitting a quick drop and circuit break by opening the switch 92, thus terminating the valve-opening movement.

Figure 12:
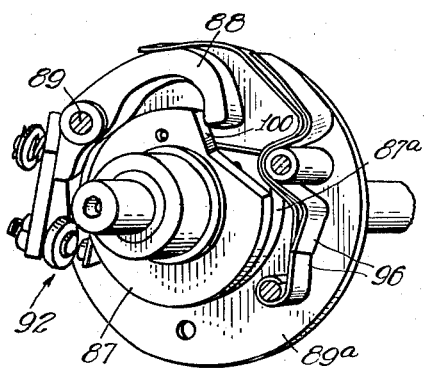
Figure 13:
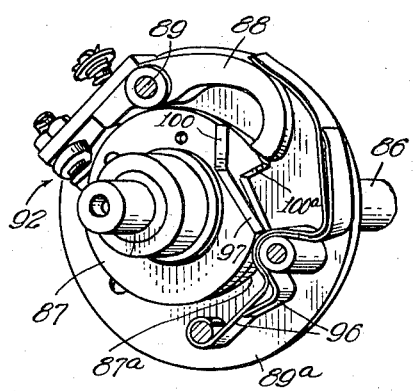

Upon actuation of the manually controlled switch to close the valve, the switch 78 now being closed, the counter-shaft 86 now rotates in a clockwise direction and with it the disc 87. The disc 87a however momentarily cannot rotate in a clockwise direction because of the pawl 88. During this time the pin 101 fixed on the disc 87 is traveling also clockwise in the slot 102 against the action of the spring 87b which is placed under tension. Before the pin reaches the limit of the slot 102 in this direction, the inclined face 100 of the disc 87 has advanced sufficiently (Fig. 12) of the face 100a to cam the pawl off of this face 100a and onto the periphery of the disc 87, which again closes the switch 92. Thereupon the spring 87b rotates the disc back to a position forwardly again of the inclined face 100 of the disc 87 for the next cycle of operation.

In order to vary the time interval for opening of the switch 92, the support 89 for the pawl 88 and the switch 92 are carried on the annular members 89a, 89b which are bolted together and have a bearing on the sleeve 86a of the shaft 86 but are free with respect to the shaft. One of these members 89b is in the form of a worm gear which meshes with a worm 89c carried by the bracket 89d suitably mounted in the casing section 73. This worm is self-locking so that it prevents the members 89a, 89b from rotating. However, by inserting a screw-driver in the kerf 89e of the shaft of this worm 89c it may be rotated to cause rotation of the members 89a, 89b to vary the location of the pawl with respect to the peripheral cut 97 of the discs 87, 87a.

In addition to the improved mechanical operation of the heretofore described mechanism, means are provided for hand operation of the shaft 45 to open or close the valve, and this provision will next be described. The worm shaft 51 is extended exteriorly of the mechanism casing as shown at 110 and is adapted to have a hand crank keyed thereto. While the teeth of the worm 50 are formed so that rotation of the worm wheel 49 does not cause rotation of the worm 50, these teeth are so formed that rotation of the worm shaft 51 causes rotation of the worm wheel 49 and thus the worm 50 is self-locking in one direction but permits transmission of power by the shaft 51 to the spider 40. It will be understood, for reasons already explained, that when the spider 40 rotates, the entire gear train comprising the spider, the plungers, the stub shaft 31 and the output shaft 45 may rotate as a unit. Also, if the clutch 23 should happen to be engaged at the time of said hand operation, the motor shaft 11 will also rotate as a unit with the output shaft 45. For example, hand rotation of the spider 40 counterclockwise will rotate the output shaft 45 in the same direction to close the valve and conversely hand rotation of the spider 40 clockwise will rotate the output shaft 45 in the latter direction to open the valve, regardless of whether the motor is also connected or not, the motor tending merely to accelerate or decelerate the hand operation. Thus, by means of the expedients described, hand operation of the valve is always possible regardless of the relative positions of the other parts of the mechanism. Furthermore, the motor drive is not through the worm 50, and the motor drive is not re-set by the spring 54. Thus at all times the mechanism is and must be controlled by the operator with the desirable exception that an overload automatically disconnects and shuts off the motor.

It may sometimes be desirable to have the current shut off from the motor during closing movement of the valve after a time interval, independently of the overload cut-off mechanism just described, as for example, for partial closing of the valve, and for this purpose there may be provided another time interval switch mechanism similar to the switch 92, and indicated diagrammatically at 200 in place of the switch 78.

The casing structure 20 is arranged so that the entire mechanism contained in this end section of the casing may be operated in oil in the usual manner.

Manifestly, the invention is not limited to details of construction shown for purposes of illustration. Furthermore, it is not indispensable that all features of the invention be used conjointly, as various combinations and sub-combinations may be advantageously employed.

Having described my invention, I claim:

1. In power transmission mechanism of the class described, the combination with a motor, of speed changing mechanism, and a jaw clutch between said motor and said speed changing mechanism wherein there is an auxiliary friction clutch operable upon rotation of the motor in one direction only and during disengagement of the first mentioned clutch.

2. In valve control power transmission mechanism of the class described, the combination with a motor, of speed changing mechanism including a normally stationary internal gear rotatable under predetermined conditions, a positive jaw clutch between said motor and said speed changing mechanism, and an auxiliary friction clutch transmitting power when the jaw clutch is disengaged.

3. In power transmission mechanism, the combination with a source of power, of an out-put shaft having an enlarged hub, the combination of a worm integral with and of substantially the diameter of said hub, and a rotatable switch control shaft having a worm pinion in engagement with said worm.

4. The structure of claim 3 wherein the switch control shaft has a worm thereon for driving a switch control countershaft.

5. The structure of claim 3 wherein the switch control shaft has a worm thereon for driving a switch control countershaft and wherein the switch control countershaft drives a pair of cammed disks, one directly and another by resilient means from the first disk for making and breaking the circuit to the source of power for said out-put shaft.

6. In valve control mechanism, the combination with a source of power, of speed reduction mechanism, a positive clutch therebetween, means including a normally stationary worm movable axially upon the encountering of an overload by said mechanism to disconnect the clutch power, and an auxiliary friction clutch for transmitting the power when the positive clutch is disengaged and the power is applied to open the valve.

7. In power transmission mechanism of the class described, the combination of speed changing mechanism including a normally stationary internal gear partially rotatable under predetermined conditions, an output shaft having a hollow hub received within the internal gear, slots in said hub, plungers in said slots, an input shaft having a portion within said hollow hub, eccentrics on said input shaft for reciprocating said plungers into and out of engagement with the teeth of said internal gear, a worm wheel fixed to said internal gear, a self-locking worm engaging said worm wheel whereby rotation of the worm rotates the worm wheel, gear, and output shaft, but rotation of the worm wheel does not substantially rotate the worm but moves the worm axially, and a spring resisting movement of the worm axially but permitting said axial movement upon the encountering of a predetermined resistance to rotation of the output shaft in a given direction whereupon the said internal gear rotates partially in an opposite direction.

8. In power transmission mechanism of the class described, the combination with a source of power, of an input shaft and an output shaft, an internal gear and reactive parts adapted under the influence of rotation of said input shaft to react with said internal gear to cause rotation of said output shaft, a clutch between said source of power and said input shaft, a worm wheel fixed on said internal gear, a worm meshing with said worm wheel, said worm being movable axially by rotation of said worm wheel upon the encountering of a predetermined resistance to rotation of said output shaft but said output shaft being adapted to be driven by said input shaft independently of rotation of said worm wheel and worm, a spring resisting said axial movement of the worm until said predetermined resistance is encountered, and means actuated by axial movement of the worm for disconnecting said clutch.

9. In power transmission mechanism of the class described, the combination with a source of power, of an input shaft and an output shaft, speed reducing mechanism including an internal gear and reactive parts adapted under the influence of rotation of said input shaft to react with said internal gear to cause rotation of said output shaft at a reduced speed, a clutch between said source of power and said input shaft, a worm wheel fixed on said internal gear, a worm meshing with said worm wheel, said worm being movable axially by rotation of said worm wheel upon the encountering of a predetermined resistance to rotation of said output shaft but said output shaft being adapted to be driven by said input shaft independently of rotation of said worm wheel and worm, a spring resisting said axial movement of the worm until said predetermined resistance is encountered, means actuated by axial movement of the worm both for disconnecting said clutch and for shutting off the power to said source, and means for rotating said worm to cause rotation of said gear and output shaft independently of said source of power.

10. In power transmission mechanism of the class described, the combination with a source of power, of input and output shafts, an internal gear rotatable under predetermined conditions, reactive parts adapted under the influence of rotation of said input shaft to react with said internal gear to cause rotation of said output shaft, a clutch between said source of power and said input shaft, a spring resisting rotation of said gear until a predetermined resistance to rotation of said output shaft is reached, and means actuated by rotation of said gear to compress said spring to disconnect said clutch.

11. In power transmission mechanism of the class described, the combination with a motor, of speed changing mechanism including an internal gear continuously rotatable under predetermined conditions and input and output shafts, said output shaft having a hollow hub received within the internal gear, slots in said hub, plungers in said slots, said input shaft having a portion within said hollow hub, eccentrics on said input shaft for reciprocating said plungers into and out of engagement with said internal gear, a worm wheel fixed to said internal gear, a worm engaging said worm wheel whereby said output shaft is driven by said source of power independently of rotation of the internal gear but rotation of the output shaft tends to cause rotation of the gear in a direction opposite to rotation of the output shaft, a spring resisting rotation of the gear in said direction, and means including said worm for causing rotation of the gear in the same direction as the output shaft to drive said output shaft.

CARL G. WENNERSTROM.